United States Patent
Dey et al.

(10) Patent No.: US 9,954,942 B2
(45) Date of Patent: Apr. 24, 2018

(54) RESULT AGGREGATION

(71) Applicant: Hewlett-Packard Development Company, L.P., Houston, TX (US)

(72) Inventors: Prasenjit Dey, Bangalore Karnataka (IN); Praphul Chandra, Bangalore Karnataka (IN); Amit Gupta, Bangalore Karnataka (IN); Kalyanasundaram Arun, Bangalore Karnataka (IN)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 178 days.

(21) Appl. No.: 14/648,982

(22) PCT Filed: Dec. 11, 2013

(86) PCT No.: PCT/US2013/074281
§ 371 (c)(1),
(2) Date: Jun. 2, 2015

(87) PCT Pub. No.: WO2015/088504
PCT Pub. Date: Jun. 18, 2015

(65) Prior Publication Data
US 2016/0100000 A1    Apr. 7, 2016

(51) Int. Cl.
*H04L 29/08* (2006.01)
*G06Q 10/00* (2012.01)
(Continued)

(52) U.S. Cl.
CPC ...... *H04L 67/104* (2013.01); *G06F 17/30654* (2013.01); *G06N 7/005* (2013.01); *G06Q 10/00* (2013.01)

(58) Field of Classification Search
CPC .................................................. H04L 67/104
(Continued)

(56) References Cited

U.S. PATENT DOCUMENTS

| 8,140,518 B2 | 3/2012 | Dasdan et al. |
| 2007/0162761 A1 | 7/2007 | Davis et al. |

(Continued)

FOREIGN PATENT DOCUMENTS

| KR | 1020090030149 | 3/2009 |

OTHER PUBLICATIONS

Chen, X. et al.; "Pairwise Ranking Aggregation in a Crowdsourced Setting"; Dec. 3, 2012; 10 pages.

(Continued)

*Primary Examiner* — Adnan Mirza

(57) ABSTRACT

Methods and systems for result aggregation in crowdsourcing are described. In one implementation, a task with a plurality of solution options is provided for workers to respond. Responses for the task are received from multiple workers, where each of the responses includes a worker response confidence value corresponding to one of the plurality of solution options. The worker response confidence value is indicative of confidence of a worker for the one of the plurality of solution options to be correct. A task answer for the task is estimated based on at least the worker response confidence value received from each of the multiple workers. A performance bonus for each of the multiple workers is computed based on the task answer, the worker response confidence value in the response from each worker, and a Proper Scoring Rule.

20 Claims, 3 Drawing Sheets

(51) Int. Cl.
   *G06F 17/30* (2006.01)
   *G06N 7/00* (2006.01)
(58) Field of Classification Search
   USPC .......................................................... 709/205
   See application file for complete search history.

(56) References Cited

U.S. PATENT DOCUMENTS

| | | |
|---|---|---|
| 2011/0161076 A1 | 6/2011 | Davis et al. |
| 2011/0313801 A1* | 12/2011 | Biewald ............. G06Q 10/0631 705/7.12 |
| 2012/0265573 A1* | 10/2012 | Van Pelt ........ G06Q 10/063114 705/7.14 |
| 2013/0006717 A1 | 1/2013 | Oleson et al. |
| 2013/0029769 A1 | 1/2013 | Lee |

OTHER PUBLICATIONS

Kosinski, M. et al.; "Crowd IQ: Measuring the Intelligence of Crowdsourcing Platforms"; Jun. 22-24, 2012; 10 pages.

\* cited by examiner

RESULT AGGREGATION

BACKGROUND

Crowdsourcing is popular across the globe for obtaining solutions for certain problems or queries from people. In crowdsourcing, a query or a problem is out-sourced as a task to a random group of individuals. Each of the individuals may attempt the task and provide their response as a solution for the task. Such individuals, who attempt the task and provide responses, are referred to as crowdsourced workers, or simply workers. The final solution for the task is estimated based on the responses provided by the workers.

Crowdsourcing commonly implements result aggregation techniques for estimating the final solution of a task. A result aggregation technique refers to the process used for identification of a unified result as the final solution to a task based on responses from all the workers who attempted the task. For the unified result to be of a substantially good quality, the individual responses have to be substantially truthful.

BRIEF DESCRIPTION OF DRAWINGS

The detailed description is provided with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
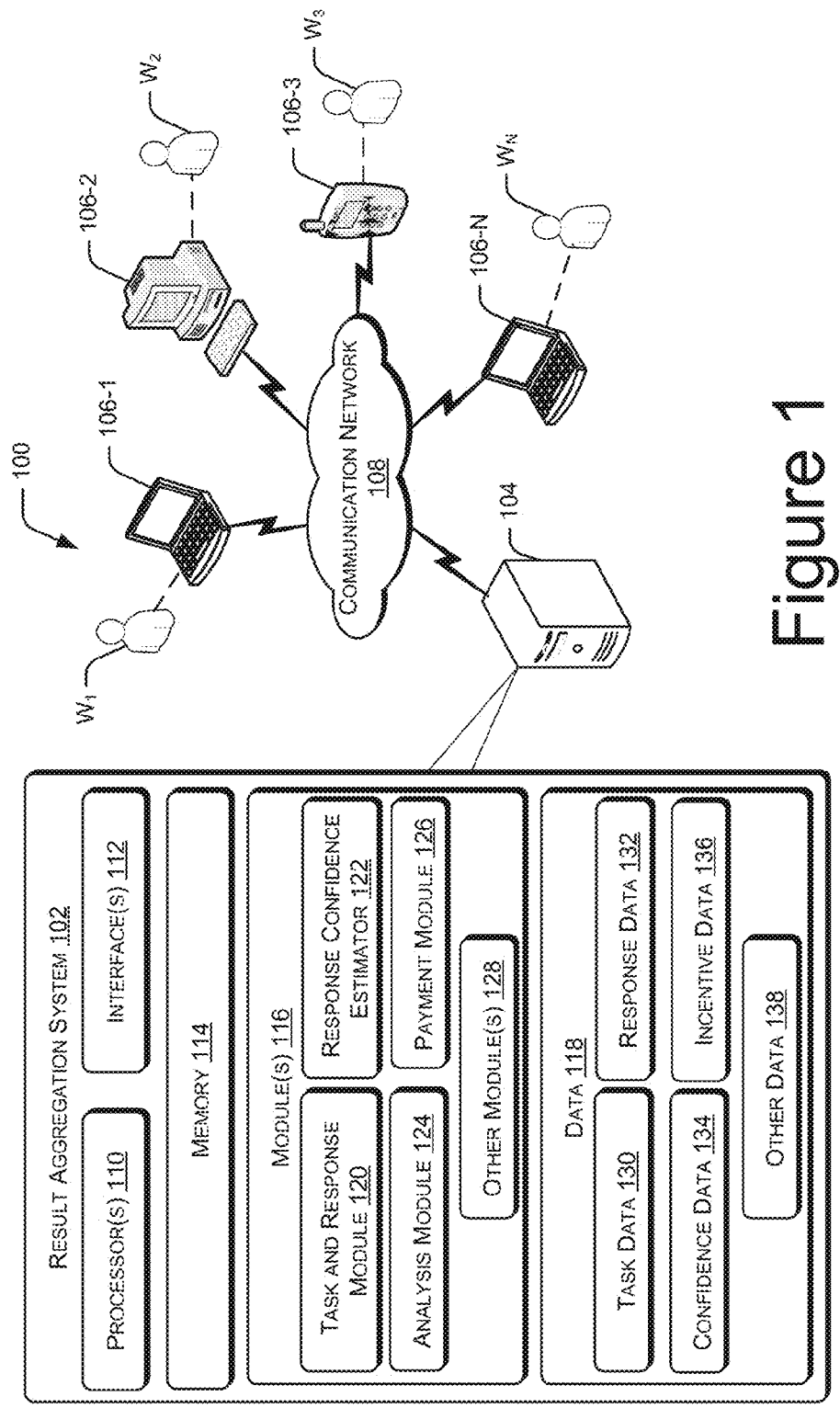
FIG. 1 illustrates a networking environment for crowdsourcing, implementing a result aggregation system, according to an implementation of the present subject matter.

The present subject matter relates to systems and methods for result aggregation in crowdsourcing.

Typically, in a crowdsourcing environment, one or more tasks, each with multiple solution options, are provided to multiple workers. Each worker, who attempts a task, provides his response including selection of one of the available multiple solution options, which according to him is a correct solution for the task. The responses from the multiple workers for a task are aggregated using a result aggregation technique to estimate the correct solution, from the solution options selected by the workers, for the task. A typical result aggregation technique includes a majority voting scheme. In the majority voting scheme, the solution options selected by the multiple workers for a task are aggregated, and the solution option with the highest number of votes, i.e., the solution option selected by the most number of workers, is inferred or estimated to be the correct solution for the task. The estimated correct solution may be referred to as the task answer.

The methodology of crowdsourcing and result aggregation has no checks and measures for taking into account the truthfulness of the responses for the task from the workers. It may be understood that at times the responses provided by the workers may not be true. However, with the result aggregation techniques in crowdsourcing, the workers' responses are assumed to include the truthful selections of solution options by the workers, and are considered without any weightage being given to the extent of truthfulness. To state this in other words, the solution options selected by the workers are assigned vote weightage values as 1, and the other solution options are assigned vote weightage values as 0. For each solution option, the vote weightage values are aggregated, and the solution option with the highest number of votes is estimated as the task answer. Without any checks and measures for the truthfulness of the responses for the task from the workers, and without any weightages with respect to truthfulness for the responses, the quality of the task answer for a task may be adversely affected, and the estimation of a substantially true or correct unified solution as the task answer is therefore also adversely affected.

Systems and methods for aggregation of responses from multiple workers for one or more tasks in a crowdsourcing environment are described herein. With the systems and the methods of the present subject matter, the quality of solution or the task answer, estimated for a task, is substantially improved and result aggregation is also made more efficient.

The systems and the methods described herein provide one or more tasks to workers to respond. Multiple workers may attempt and provide their responses to the one or more of the tasks. The response from each of the multiple workers for a task includes selection of a solution which according to him is the correct response for the task. It may be understood that the solution selected by the worker is a solution option from a plurality of possible solution options corresponding to the task, which are provided along with the task.

The systems and the methods, according to the present subject matter, allow each of the multiple workers to provide at least one confidence value in his response for a task. The at least one confidence value in the response includes a confidence value corresponding to the solution option selected by the worker as being the correct solution for that task. The confidence value is a value indicative of confidence or a level of belief of the worker for the corresponding solution option to be correct. The confidence value, corresponding to a solution option, may also be understood as a value indicative of probability of that solution option being correct. For the purpose of the present subject matter, a confidence value corresponding to a solution option for a task, based on a worker's confidence or belief, hereinafter may be referred to as a worker response confidence value.

With the responses including the worker response confidence values, a task answer or the correct solution for the task is then estimated based at least on the worker response confidence values. In an implementation, additional factors based on workers' capabilities to provide a correct solution to a task, difficulty of a task for a set of workers, and/or suitability of a task for a worker, and such, may also be used, in accordance with the present subject matter, for the estimation of the task answer. In an implementation, the task answer may be estimated based on the aggregation of the worker response confidence values for the solution options. This facilitates estimation of a substantially true unified task answer for the task, in comparison to the task answer estimated through typical result aggregation schemes.

Further, the systems and the methods of the present subject matter encourage the workers to reveal their confidence values truthfully for the solution options considered by them as correct. For encouraging the workers to provide the confidence values truthfully, appropriate incentives may be provided to each of the workers in accordance with the level of truthfulness in the corresponding worker response confidence value. In an example, no incentive may be provided to a worker who is lying about his confidence value, and maximum incentive may be provided to a worker who is providing his confidence value substantially truthfully. The incentives may be provided as performance bonuses in the form of monetary values.

In an implementation, a performance bonus for each of the multiple workers attempting a task is computed based on the estimated task answer, the worker response confidence value in the response provided by the corresponding worker, and a Proper Scoring Rule. The Proper Scoring Rule provides a measure of how correct the prediction of the worker is in respect of the estimated task answer. The Proper Scoring Rule is applied on the confidence value provided by the worker to measure how correct or how good the confidence value is with respect to the correct solution for the task or the estimated task answer for the task. For the purpose of computation of the performance bonus for each of the multiple workers, the Proper Scoring Rule may be selected to substantially ensure that the workers have no incentive to lie. The trueness of the worker response confidence value may be indicated by (1) whether the worker has selected the solution option the same as the estimated task answer, and (2) the order of worker response confidence value provided by the worker with respect to the estimated task answer.

With the utilization of worker response confidence values for the aggregation of results, and with an incentive-based provision that encourages the workers to select true solution options and provide confidence values for the selected solution option with a level of truthfulness, the quality of the estimated task answer for a task is substantially improved. Also, a substantially true task answer is robustly estimated for a task through an aggregation process in comparison to the typical result aggregation techniques for crowdsourcing.

The systems and the methods described herein may be implemented in a variety of crowdsourcing environments employing a computing device, which may be communicatively coupled with user devices of multiple workers, for providing the tasks and receiving workers' responses for one or more tasks. The system, in accordance with an implementation of the present subject matter, includes a result aggregation system. The result aggregation system may be implemented in the computing device. The computing device may be implemented as, for example, a server, a computer, and such. The workers may attempt a task and provide their response using their user devices. The user devices may include, but are not restricted to, desktop computers, laptops, smart phones, personal digital assistants (PDAs), tablets, and such. In an implementation, a worker may attempt a task online, through a communication network, or offline.

In an implementation, the workers may be provided with a user interface that may be used by the workers to attempt one or more tasks. The user interface may be understood as a graphical user interface (GUI) configured for the purpose of attempting a task and providing responses for the task.

The above systems and methods are further described with reference to FIGS. 1, 2, and 3. It should be noted that the description and figures merely illustrate the principles of the present subject matter. It is thus understood that various arrangements can be devised that, although not explicitly described or shown herein, embody the principles of the present subject matter. Moreover, all statements herein reciting principles, aspects, and embodiments of the present subject matter, as well as specific examples thereof, are intended to encompass equivalents thereof.

FIG. 1 schematically illustrates a networking environment 100 for crowdsourcing, implementing a result aggregation system 102, according to an implementation of the present subject matter. The network environment 100 may be a public networking environment or a private networking environment. The result aggregation system 102 is implemented in a computing device 104 configured to provide one or more tasks and receive responses for the task to estimate a unified solution or a task answer for the task in the crowdsourcing environment. In an implementation, the computing device 104 may include, but is not limited to, a server, a workstation, a computer, and the like. The result aggregation system 102 may be a machine readable instructions-based implementation or a hardware-based implementation or a combination thereof.

For the purpose of crowdsourcing, the computing device 104 implementing the result aggregation system 102 is communicatively coupled with a plurality of user devices 106-1, 106-2, 106-3, . . . , 106-N through which workers $W_1$, $W_2$, . . . , $W_N$ may access and attempt one or more tasks. The user devices 106-1, 106-2, 106-3, . . . , 106-N, hereinafter may be collectively referred to as user devices 106, and individually referred to as a user device 106. The user devices 106 may include, but are not restricted to, desktop computers, laptops, smart phones, personal digital assistants (PDAs), tablets, and the like. The workers $W_1$, $W_2$, $W_3$, . . . , $W_N$, hereinafter, may be collectively referred to as workers W, and individually referred to as a worker W. In an implementation, a worker W attempting a task may be a registered individual or a non-registered individual intending to attempt one or more tasks. In an implementation, a worker may attempt a task online, through a communicative network, or offline.

The user devices 106 are communicatively coupled to the computing device 104 implementing the result aggregation system 102 over a communication network 108 through one or more communication links. The communication links between the user devices 106 and the computing device 104 are enabled through a desired form of communication, for example, via dial-up modem connections, cable links, and digital subscriber lines (DSL), wireless or satellite inks, or any other suitable form of communication.

Further, the communication network 108 may be a wireless network, a wired network, or a combination thereof. The communication network 108 can also be an individual network or a collection of many such individual networks, interconnected with each other and functioning as a single large network, e.g., the Internet or an intranet. The communication network 108 can be implemented as one of the different types of networks, such as intranet, local area network (LAN), wide area network (WAN), the internet, and such. The communication network 108 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other.

The communication network 108 may also include individual networks, such as but not limited to, Global System for Communication (GSM) network, Universal Telecommunications System (UMTS) network, Long Term Evolution (LTE) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the terminology, the communication network 108 includes various network entities, such as base stations, gateways and routers; however, such details have been omitted to maintain the brevity of the description.

Further, it may be understood that the communication between the computing device 104 implementing the result aggregation system 102, the user devices 106, and other entities may take place based on the communication protocol compatible with the communication network 108.

In an implementation, the result aggregation system 102 includes processor(s) 110. The processor(s) 110 may be implemented as microprocessors, microcomputers, microcontrollers, digital signal processors, central processing units, state machines, logic circuitries, and/or any devices that manipulate signals based on operational instructions. Among other capabilities, the processor(s) 110 fetch and execute computer-readable instructions stored in the memory. The functions of the various elements shown in the figure, including any functional blocks labeled as "processor(s)", may be provided through the use of dedicated hardware as well as hardware capable of executing machine readable instructions.

The result aggregation system 102 also includes interface(s) 112. The interface(s) 112 may include a variety of machine readable instructions-based interfaces and hardware interfaces that allow the result aggregation system 102 to interact with the computing device 104 and with the user devices 106. Further, the interface(s) 112 may enable the result aggregation system 102 to communicate with other communication and computing devices, such as network entities, web servers and external repositories.

Further, the result aggregation system 102 includes memory 114, coupled to the processor(s) 110. The memory 114 may include any computer-readable medium including, for example, volatile memory (e.g., RAM), and/or non-volatile memory (e.g., EPROM, flash memory, etc.).

Further, the result aggregation system 102 includes module(s) 116 and data 118. The module(s) 116 may be coupled to the processor(s) 110. The module(s) 116, amongst other things, include routines, programs, objects, components, data structures, and the like, which perform particular tasks or implement particular abstract data types. The module(s) 116 further include modules that supplement applications on the result aggregation system 102, for example, modules of an operating system. The data 118 serves, amongst other things, as a repository for storing data that may be fetched, processed, received, or generated by the module(s) 116. Although the data 118 is shown internal to the result aggregation system 102, it may be understood that the data 118 can reside in an external repository (not shown in the figure), which may be coupled to the result aggregation system 102. The result aggregation system 102 may communicate with the external repository through the interface(s) 112 to obtain information from the data 118.

In an implementation, the module(s) 116 of the result aggregation system 102 includes a task and response module 120, a response confidence estimator 122, an analysis module 124, a payment module 126, and other module(s) 128. In an implementation, the data 118 of the result aggregation system 102 includes task data 130, response data 132, confidence data 134, incentive data 136, and other data 138. The other module(s) 128 may include programs or coded instructions that supplement applications and functions, for example, programs in the operating system of the result aggregation system 102, and the other data 138 comprise data corresponding to the other module(s) 128.

The following description describes the result aggregation in crowdsourcing by the result aggregation system 102 for estimation of a task answer for one task based on responses from multiple workers W, in accordance with the present subject matter, and it will be understood that the concepts thereto may be extended to estimation of task answers for more than one task in a similar manner.

In an implementation, each of the workers W may be authenticated for attempting a task in crowdsourcing. For the purpose of attempting a task, the workers W may have to register based on which login details, including user IDs and passwords, may be given. In an implementation, workers IN who are eligible for attempting a task may be given the login details. The eligibility criteria may be set, and a worker W may be eligible to attempt a task if, for example, he is above a specific age, has a relevant educational background, has prior knowledge in certain fields, etc. The eligibility criteria may include other parameters based on which a worker W can be assessed for suitability for attempting a crowdsourcing task. In operation, a worker W may enter his login details on his user device 106. The login details may be communicated to the result aggregation system 102 for authentication. The result aggregation system 102 may be configured to authenticate one or more workers W, and allow the one or more authenticated workers to attempt one or more tasks.

For the purpose of result aggregation in crowdsourcing, the task and response module 120 provides one or more tasks for workers W to respond. Along with the tasks, the task and response module 120 is configured to provide a plurality of solution options for each task to the workers W. The solution options for a task are understood as the solutions that are possible for the task. In an example, n number of solution options are provided for each task, where $n \geq 1$. For the purposes of the description herein, the tasks may be denoted as T, and the n number of solution options for an $i^{th}$ task Ti may be denoted as $(q^i_1, q^i_2, \ldots, q^i_n)$. The information related to the tasks T and the solution options q for all the tasks are stored in the task data 130.

Based on the tasks provided by the task and response module 120, multiple workers W may receive one or more tasks T on their user devices 106. The multiple workers W may attempt a task Ti and provide their responses based on the solution options $q^i$ corresponding to the task Ti. Each worker W may select one of the solution options $q^i$ which he considers as the correct solution for the task Ti. Further, the task and response module 120 is configured to receive responses with the selected solution option $q^i$ from the workers W for the task Ti attempted by them. The responses from the workers W are stored in the response data 132.

In an example, m number of workers W may attempt the $i^{th}$ task Ti, where $m \geq 1$. For the purposes of the description herein, the m number of workers W attempting the $i^{th}$ task Ti are denoted as $(W^i_1, W^i_2, \ldots, W^i_m)$. Further, the responses from the m number of workers W for the $i^{th}$ task Ti are denoted as $(R^i_1, R^i_2, \ldots, R^i_m)$.

In an implementation, the task and response module 120 is configured to pair-up the workers W and the tasks attempted by them. A set of workers W attempting $i^{th}$ task Ti may be grouped together. The pairing of the workers W with a task Ti may be based on one or more worker identification attributes. The worker identification attributes for a worker W may include, but are not restricted to, login details of the worker (if any), name, contact details, and other such information. The worker identification attributes, such as names and contact details, may be provided by the workers W. The worker identification details may be stored in the data 118.

Further, the task and response module 120 is configured to allow each of the multiple workers $W^i$, attempting the task Ti, to provide at least one worker response confidence value in his response $R^i$. As mentioned earlier, the at least one worker response confidence value includes a value indicative of confidence of the worker $W^i$ for the solution option $q^i$ selected by him as the correct solution for the task Ti. For the purposes of the description herein, the worker response confidence value provided by the $j^{th}$ worker $W^i_j$ for the selected solution option $q^i$ for the task Ti is denoted as $C_{ij}$.

In an example, the $j^{th}$ worker $W^i_j$ may provide his response $R^i_j$ for the task Ti with confidence of 80%. This means that the worker $W^i_j$ has 80% confidence that the solution option $q^i$ selected by him for the task Ti is the correct solution. With this, the corresponding worker response confidence value $C_{ij}$ will take as a value of 0.8. Similarly, another worker, the $t^{th}$ worker $W^i_t$ may provide his response $R^i_t$ for the task Ti with confidence of 50%. This means that the worker $W^i_t$ has 50% confidence that the solution option $q^i$ selected by him for the task Ti is the correct solution. With this, the corresponding worker response confidence value $C_{it}$ will take as a value of 0.5.

In an implementation, each worker $W^i_j$ may provide the worker response confidence value $C_{ij}$ for the solution option $q^i$ selected by him as the correct solution for the task Ti. The confidence values for the other possible solution options $q^i$, i.e., the left-over solution options $q^i$, may be computed by the result aggregation system 102, as described later in the description.

In an implementation, each worker $W^i_j$ may provide the worker response confidence values $C_{ij}$ for all the solution option $q^i$ that are possible for the task Ti. For said implementation, the worker response confidence values $C_{ij}$ for all the solution options $q^i$ may add up to 1.

In an example, the worker $W^i_j$ may manually input the worker response confidence value $C_{ij}$ or may set the worker response confidence value $C_{ij}$ on slider-type inputs on the GUI provided to the worker $W^i_j$ for crowdsourcing. The one or more worker response confidence values $C_{ij}$ provided by the workers $W^i$ are stored in the response data 132.

Further, based on the responses $R^i$ with the at least one worker response confidence value $C_{ij}$ from the multiple workers $W^i$, the response confidence estimator 122 determines system response confidence values for all the solution options $q^i$ possible for each task Ti. A system response confidence value for a solution option for a task Ti is a value indicative of confidence of the result aggregation system 102 that the solution option is the correct solution option based on response from a worker for the task Ti. Thus, for the solution options $q^i$ of the $i^{th}$ task Ti, the system response confidence values form a set indicative of distribution of confidence values. For the purposes of the description herein, the set of system response confidence values for the solution options $q^i$ of the $i^{th}$ task Ti attempted by the $j^{th}$ worker $W^i_j$ is denoted as $\{P_{ij}\}=\{P_{ij}^1, P_{ij}^2, \ldots, P_{ij}^n\}$, corresponding to the n number of solution options ($q^i_1, q^i_2, \ldots, q^i_n$). The system response confidence values $\{P_{ij}\}$ are determined for the purpose of estimation of the task answer by the result aggregation system 102, as described later in the description. The system response confidence values $\{P_{ij}\}$ are stored in the confidence data 134.

The description hereinafter describes how system response confidence values $\{P\}$ may be determined by the response confidence estimator 122, in accordance with various implementations. For the sake of simplicity, the determination of system response confidence values for the solution options $q^i$ for the task Ti attempted by the $j^{th}$ worker $W^i_j$ is described. The system response confidence values for other the task Ti attempted by other workers $W^i$ and for other tasks T can be determined in a similar manner.

In an implementation, the response confidence estimator 122 may determine the system response confidence values $\{P_{ij}\}$ based on the worker response confidence value $C_{ij}$. In the implementation where the worker $W^i_j$ provides the worker response confidence value $C_{ij}^n$ for one of the solution option $q^i_n$ selected by him as the correct solution option, the system response confidence value $P_{ij}^n$ for that solution option is set equal to the worker response confidence value $C_{ij}^n$. For determining the system response confidence values for other solution options $q^i$, the response confidence estimator 122 subtracts the worker response confidence value $C_{ij}$ from 1, and divides the difference equally to assign equal values, as the system response confidence values, to the other solution options. In example, consider that the task Ti has four possible solution options as A, B, C, and D, and the worker $W^i_j$ provides the response to the task Ti with the solution option B and the corresponding worker response confidence value $C_{ij}$ as 0.7. With this, the system response confidence value $P_{ij}$ for the solution option B is 0.7, and the system response confidence values $P_{ij}$ for the other solution options A, C, and D are 0.1 ([1−0.7]/3). Thus, the set of system response confidence values $\{P_{ij}\}$ is {0.1, 0.7, 0.1, 0.1}.

In the implementation where the worker $W^i_j$ provides the worker response confidence values $C_{ij}$ for all the solution options $q^i$, the system response confidence values $P_{ij}$ for the solution options $q^i$ are set equal to the corresponding worker response confidence values $C_{ij}$. In example, consider that the task Ti has four possible solution options as A, B, C, and D, and the worker $W^i_j$ provides the response to the task Ti with the worker response confidence values $C_{ij}$ as (0.2, 0.7, 0.1, 0) corresponding to the solution options (A, B, C, D). With this, the set of system response confidence values $\{P_{ij}\}$ for the solution options (A, B, C, D) is {0.2, 0.7, 0.1, 0}.

In an implementation, the response confidence estimator 122 may determine the system response confidence values $\{P_{ij}\}$ based on factors related to workers' capabilities to provide a correct solution to a task and related to difficulty levels of a task for a set of workers, in addition to the worker response confidence value $C_{ij}$. The contribution of factors related to workers' capability and task difficulty, in a system response confidence value $P_{ij}$, may be termed as capability/difficulty-based response confidence value. For the purposes of the description herein, the capability/difficulty-based response confidence value for the solution option $q^i$ of the $i^{th}$ task Ti selected as the correct solution option by the $j^{th}$ worker $W^i_j$ is denoted as $A_{ij}$. In this implementation, the worker $W^i_j$ selects one of the solution options $q^i_n$ for the task Ti and provides the worker response confidence value $C_{ij}$ for that selected solution option $q^i_n$. The response confidence estimator 122 then determines the system response confidence value $P_{ij}^n$ for the selected solution option $q^i_n$ as, for example, a weighted average of capability/difficulty-based response confidence value $A_{ij}$ and the worker response confidence value $C_{ij}$. That is, the system response confidence value $P_{ij}^n$ for the selected solution option $q^i_n$ is $\alpha*A_{ij}+(1-\alpha)*C_{ij}$, where $\alpha$ is a predefined weightage factor<1. For determining the system response confidence values for other solution options $q^i$, the response confidence estimator 122 subtracts the determined system response confidence value $P_{ij}^n$ for the selected solution option $q^i_n$ from 1, and divides the difference equally to assign equal values, as the system response confidence values, to the other solution options.

The capability/difficulty-based response confidence value $A_{ij}$ is a function of worker capability factor and task difficulty factor. In an example, the capability/difficulty-based response confidence value $A_{ij}$ may be represented as:

$$A_{ij}=c*\exp(-d_i/p_j)+d, \quad \text{Eq.(1)}$$

where, $p_j$ is the worker capability factor characterized based on the capability of the $j^{th}$ worker $W_j$, $d_i$ is the task difficulty factor characterized based on how difficult the $i^{th}$ task Ti is for a predefined set of workers W, and c and d are constants. The worker capability factor $p_j$ is indicative of a probability of the $j^{th}$ worker $W_j$ to respond to a random task correctly. The worker capability factor $p_j$ may be calculated based on the worker's characteristics, such as the past performance in resolving the tasks, educational qualification, etc. Further, the task difficulty factor $d_i$ is indicative of a probability of a random worker W responding the $i^{th}$ task Ti correctly. The task difficulty factor $d_i$ may be calculated based on one or more task's characteristics, task similarity with the previously solved tasks by the same set of workers, etc. In an implementation, the worker capability factors $p_j$ for multiple workers W and the task difficultly factors $d_i$ for multiple tasks may be pre-stored in the confidence data 134.

The determination of $A_{ij}$ as represented by Eq. (1) indicates that (a) for a given task, the confidence value is higher for the responses by the workers with higher capabilities (i.e., high $p_j \rightarrow$ high $A_{ij} \rightarrow$ high $P_{ij}$), and (b) for a given worker, the confidence value is more for the responses for easier tasks (i.e., low $d_i \rightarrow$ high $A_{ij} \rightarrow$ high $P_{ij}$).

Further, the constants c and d are determined by setting the following boundary conditions on the ratio of $d_i/p_j$ as illustrated in Table 1:

TABLE 1

| boundary condition B1 | as $d_i/p_j \rightarrow 0$, $A_{ij} \rightarrow 1$ | With this, the trivial tasks can be completed successfully by any worker with finite (non-zero) $p_j$. |
|---|---|---|
| boundary condition B2 | as $d_i/p_j \rightarrow \infty$, $A_{ij} \rightarrow 0$ | With this, the worst worker ($p_j \rightarrow 0$) always responds incorrectly any non-trivial task (non-zero $d_i$). |
| boundary condition B3 (Alternative to boundary condition 2) | as $d_i/p_j \rightarrow \infty$, $A_{ij} \rightarrow 1/n_i$ (where $n_i$ is the number of solution options for the $i^{th}$ task) | The worst worker ($p_j \rightarrow 0$) always responds randomly. |

In an implementation, the boundary conditions B1 and B2, as mentioned in Table 1, may be used to determine c and d. With the boundary conditions B1 and B2, c can be determined as 1 and d can be determined as 0. Thus, $A_{ij}=\exp(-d_i/p_j)$. The boundary conditions B1 and B2 may be used to determine the constants c and d for crowdsourcing environments where the workers W have a biased or adversarial nature and, hence, they consistently perform worse than random. With this, the estimation of a substantially good quality task answers for the tasks T, as described in detail later in the description, is possible in view of the biased or adversarial nature of the workers W attempting the tasks T.

In an implementation, the boundary conditions B1 and B3, as mentioned in Table 1, may be used to determine c and d. With the boundary conditions B1 and B3, c can be determined as $(n_i-1)/n_i$ and d can be determined as $1/n_i$. Thus, $A_{ij}=[(n_i-1)/n_i]*\exp(-d_i/p_j)+1/n_i$. The boundary conditions B1 and B3 may be used to determine c and d for crowdsourcing environments where the workers W have an unbiased or non-adversarial nature and, hence, on an average, the worst a worker can do is choose among the responses at random.

In an implementation, the response confidence estimator 122 may determine the system response confidence values $\{P_{ij}\}$ based on factors related to workers' capabilities to provide a correct solution to a task and related to suitability of a task for a worker, in addition to the worker response confidence value $C_{ij}$. The contribution of factors related to workers' capability and task suitability, in a system response confidence value $P_{ij}$, may be termed as capability/suitability-based response confidence value. For the purposes of the description herein, the capability/suitability-based response confidence value for the solution option $q^i$ of the $i^{th}$ task Ti selected as the correct solution option by the $j^{th}$ worker $W_j^i$ is denoted as $B_{ij}$. In this implementation, the worker $W_j^{ii}$ selects one of the solution options $q_n^i$ for the task Ti and provides the worker response confidence value $C_{ij}$ for that selected solution option $q_n^i$. The response confidence estimator 122 then determines the system response confidence value $P_{ij}^n$ for the selected solution option $q_n^i$ as, for example, a weighted average of capability/suitability-based response confidence value $B_{ij}$ and the worker response confidence value $C_{ij}$. That is, the system response confidence value $P_{ij}^n$ for the selected solution option is $q_n^i$ is $\beta*B_{ij}+(1-\beta)*C_{ij}$, where $\beta$ is a predefined weightage factor<1. For determining the system response confidence values for other solution options $q^i$, the response confidence estimator 122 subtracts the determined system response confidence value $P_{ij}^n$ for the selected solution option $q_n^i$ from 1, and divides the difference equally to assign equal values, as the system response confidence values, to the other solution options.

The capability/suitability-based response confidence value $B_{ij}$ is a function of worker capability factor and task suitability factor. In an example, the capability/suitability-based response confidence value $B_{ij}$ may be represented as:

$$Bij=e*\exp(-1/\theta_{ij}*p_j)+f, \quad \text{Eq. (2)}$$

where, $p_j$ is the worker capability factor characterized based on the capability of the $j^{th}$ worker $W_j$, $\theta_{ij}$ is the task suitability factor characterized based on how suitable the $i^{th}$ task Ti is for the $j^{th}$ worker $W_j^i$, and e and f are constants. The worker capability factor $p_j$ is the same as mentioned earlier. The task suitability factor $\theta_{ij}$ is indicative of a probability of suitability of the $i^{th}$ task Ti for the $j^{th}$ worker $W_j^i$. The probability of suitability of a task for a worker indicates to how suitable the task is for responding correctly by the worker. The task suitability factor $\theta_{ij}$ may be calculated based on capability requirements for the $i^{th}$ task Ti and based on the capabilities of the workers W. In an example, a similarity measure, such as cosine similarity, between the capability requirements for the $i^{th}$ task Ti and the capabilities of the workers W may be used to calculate the task suitability factor $\theta_{ij}$. In an implementation, the worker capability factors $p_j$ for multiple workers W and the task suitability factors $\theta_{ij}$ for multiple tasks T and workers W may be pre-stored in the confidence data 134.

The determination of $B_{ij}$ as represented by Eq. (1) indicates that for a given worker, the confidence value is higher for the responses for the tasks which are more suitable for the workers (i.e., high $\theta_{ij} \rightarrow$ high $B_{ij} \rightarrow$ high $P_{ij}$). As seen from Eq. (1) and Eq. (2), the capability/difficulty-based response confidence value $A_{ij}$ is similar to the capability/suitability-based response confidence value $B_{ij}$ with $\theta_{ij}=1/d_i$. Thus, the constants e and f are determined by setting the boundary conditions B1 and B2, or B1 and B3, on the ratio of $1/\theta_{ij}*p_j$ as illustrated in Table 1, with $\theta_{ij}=1/d_i$.

As mentioned above, in an implementation, the system response confidence values $\{P_{ij}\}$ may be determined based on the worker response confidence value(s) $C_{ij}$ provided by the worker $W^i_j$. This may be implemented in cases where no or substantially less information is available about the worker capabilities, task difficulties and/or task suitabilities. This facilitates in estimating a substantially good quality task answer for the tasks in crowdsourcing environments where a large number of workers attempt a large number of heterogeneous tasks, where tasks are being attempted by new workers, or where new tasks are being provided to the workers.

Further, the determination of the system response confidence values $\{P_{ij}\}$ based on the worker response confidence value(s) $C_{ij}$ provided by the worker $W^i_j$, is useful as the worker capabilities factor $p_j$ is the probability of correct completion of task by the worker $W^i_j$ based on historical records. However, the worker $W^i_j$ maybe very good at the current task even though he may not have fared very well in the past. The usage of the worker response confidence value $C_{ij}$ facilitates in compensating for such biases and giving a fair chance to the worker $W^i_j$ to be able to contribute to estimate the correct task answer.

After determining the sets of system response confidence values $\{P_{ij}\}$ for all the solution options $q^i$ possible for each task Ti for all the multiple workers $W^i$ attempting the task Ti, the analysis module 124 estimates the task answer for the task Ti based on the determined system response confidence values $\{P_{ij}\}$. As mentioned earlier, the task answer is the correct solution, one from the possible solution options $q^i$, for the task Ti estimated based on worker's responses $R^i$.

In an implementation, the analysis module 124 aggregates the system response confidence values $\{P_{ij}\}$ in order to estimate the task answer. For this, the system response confidence values corresponding to the each solution option $q^i$ and for the responses from all the multiple workers $W^i$ attempting the task Ti, are added together. For the purposes of the description herein, the set of individual totals of the system response confidence values for the solution options $q^i$ for the task Ti are termed as aggregated confidence values for the solution options $q^i$ and are denoted as $\{Z^i\}=\{Z^i_1, Z^i_2, \ldots, Z^i_n\}$ corresponding to the n number of solution options $(q^i_1, q^i_2, \ldots, q^i_n)$. The aggregated confidence values $\{Z^i\}$ for the solution options $q^i$ may be normalized such that the sum total of the aggregated confidence values in the set $\{Z^i\}$ is equal to 1. The aggregated confidence values for the solution options $q^i$ are stored in the confidence data 134.

Based on the set of aggregated confidence values $\{Z^i\}$, the solution option for which the aggregated confidence value is the highest is selected by the analysis module 124 to be the task answer for the task Ti. In an implementation, a solution option with the highest aggregated confidence value may be considered as the task answer when the corresponding aggregated confidence value is more than a predefined threshold value.

Further, after estimating the task answer for the task Ti, the payment module 126 computes a performance bonus for the each of the multiple workers $W^i$ attempting the task Ti. The performance bonus is computed based on the estimated task answer, the worker response confidence value provided by the worker, and a Proper Scoring Rule. As mentioned earlier, the Proper Scoring Rule provides a measure of how correct the prediction of the worker is in respect of the estimated task answer. Thus, the Proper Scoring Rule is used to compute the performance bonus for each of the multiple workers $W^i$. As mentioned earlier, the performance bonus is in the form of a monetary value, which provides incentives such that the workers $W^i$ attempting the task Ti are encouraged to reveal the confidence value for the selected solution option substantially truthfully. The Proper Scoring Rule are selected and applied to compute the performance bonuses for the workers to ensure that the workers are not encouraged to lie about the confidence values provided by them for attempting the tasks. The information related to performance bonuses for the workers is stored in the incentive data 136.

For computing the performance bonus for one of the workers $W^i_j$ attempting the task Ti, the payment module 126 determines a worker revealed confidence distribution over the solution options $q^i$ possible for the task Ti. The worker revealed confidence distribution for $j^{th}$ worker $W^i_j$ is determined based on the worker response confidence value $C_{ij}$ provided by the worker $W^i_j$. For the purposes of the description herein, the worker revealed confidence distribution over the solution options $q^i$ for the $i^{th}$ task Ti attempted by the $j^{th}$ worker $W^i_j$ is denoted as $\{r_{ij}\}=\{r_{ij}^1, r_{ij}^2, \ldots r_{ij}^n\}$, corresponding to the n number of solution options $(q^i_1, q^i_2, \ldots, q^i_n)$. Each element of the worker revealed confidence distribution $\{r_{ij}\}$ is referred to as the worker revealed confidence value for the corresponding solution option $q^i$.

For determining the worker revealed confidence distribution $\{r_{ij}\}$, in the implementation where the worker $W^i_j$ provides the worker response confidence value $C_{ij}^n$ for one of the solution option $q^i_n$ selected by him at the correct solution option, the worker revealed confidence value $r_{ij}^n$ for that solution option is set equal to the worker response confidence value $C_{ij}^n$. For determining the worker revealed confidence values for other solution options, the payment module 126 subtracts the worker response confidence value $C_{ij}$ from 1, and divides the difference equally to assign equal values as the worker revealed confidence values over the other solution options. In example, consider that the task Ti has three possible solution options as A, B, and C, and the worker $W^i_j$ provides the response to the task Ti with the solution option B and the corresponding worker response confidence value $C_{ij}$ as 0.7. With this, the worker revealed confidence value for the solution option B is 0.7, and the worker revealed confidence values for the other solution options A and C and D are 0.15 ($[1-0.7]/2$). Thus, the worker revealed confidence distribution $\{r_{ij}\}$ over the solution option (A, B, C) is $\{0.15, 0.7, 0.15\}$.

In the implementation where the worker $W^i_j$ provides the worker response confidence values $C_{ij}$ for all the solution options $q^i$, the worker revealed confidence distribution $\{r_{ij}\}$ over the solution options $q^i$ are determined by setting the worker revealed confidence values equal to the corresponding worker response confidence values $C_{ij}$. In example, consider that the task Ti has three possible solution options as A, B, and C, and the worker $W^i_j$ provides the response to the task Ti with the worker response confidence values $C_{ij}$ as (0.2, 0.7, 0.1) corresponding to the solution options (A, B, C). With this, the worker revealed confidence distribution $\{r_{ij}\}$ over the solution options (A, B, C) is $\{0.2, 0.7, 0.1\}$.

After determining the worker revealed confidence distribution $\{r_{ij}\}$ for the $j^{th}$ worker $W^i_j$ attempting the $i^{th}$ task Ti, the payment module 126 determines a performance score for the worker $W^i_j$. The performance score is determined based on the estimated task answer, the worker revealed confidence distribution $\{r_{ij}\}$, and a Proper Scoring Rule. The performance score for a worker is indicative of how good or correct the worker's response for the confidence value is with respect to the estimated task answer.

For the $j^{th}$ worker $W^i_j$ attempting the $i^{th}$ task Ti, with the worker revealed confidence distribution $\{r_{ij}\}$ as $\{r_{ij}^1, r_{ij}^2, \ldots, r_{ij}^k, \ldots r_{ij}^n\}$ and the estimated task answer being the $k^{th}$ solution option $q^i_k$, in an implementation, the performance score may be determined using a logarithmic-based Proper Scoring Rule as:

$$S_k(r_{ij}) = \ln(r_{ij}^k).$$

In another implementation, the performance score may be determined using a quadratic-based Proper Scoring Rule as:

$$S_k(r_{ij}) = 2*r_{ij}^k - \Sigma r_{ij}^h, \text{ where } h=1 \text{ to } n.$$

In another implementation, the performance score may be determined using a power-based Proper Scoring Rule as:

$$S_k(r_{ij}) = \lambda*(r_{ij}^k)^{\lambda-1} - \Sigma(r_{ij}^h)^\lambda, \text{ where } h=1 \text{ to } n, \text{ and } \lambda>1.$$

The worker revealed confidence distributions {r} and the performance scores for all the workers $W^i$ attempting the task Ti are determined by the payment module 126 is a manner described above.

Further, after determining the performance scores for all the workers $W^i$, the payment module 126 computes the performance bonus for each of the workers $W^i$ as a linear transformation of the performance score determined for the corresponding worker. In an implementation, the monetary incentives can then be paid to the workers $W^i$ attempting the task Ti based on the corresponding computed performance bonuses.

The methodology followed for determining the performance score and computing the performance bonus as a linear transformation of the performance score conveys that the choice of Proper Scoring Rule impacts the performance bonuses or the monetary incentives paid to the workers, and can be a factor in maintaining workers' performance and satisfaction in a crowdsourcing platform. The Proper Scoring Rules, as mentioned above, are incentive compatible. In other words, the computation of incentives or bonuses for the workers based on one of the abovementioned Proper Scoring Rules substantially ensures that the workers should have no incentive to lie. This encourages the workers to reveal their true belief for the solution options and the confidence values for a task. With the workers providing their responses truthfully, the quality of task answers estimated for the tasks is substantially good, and substantially true task answers are estimated for the tasks.

Figure 2:
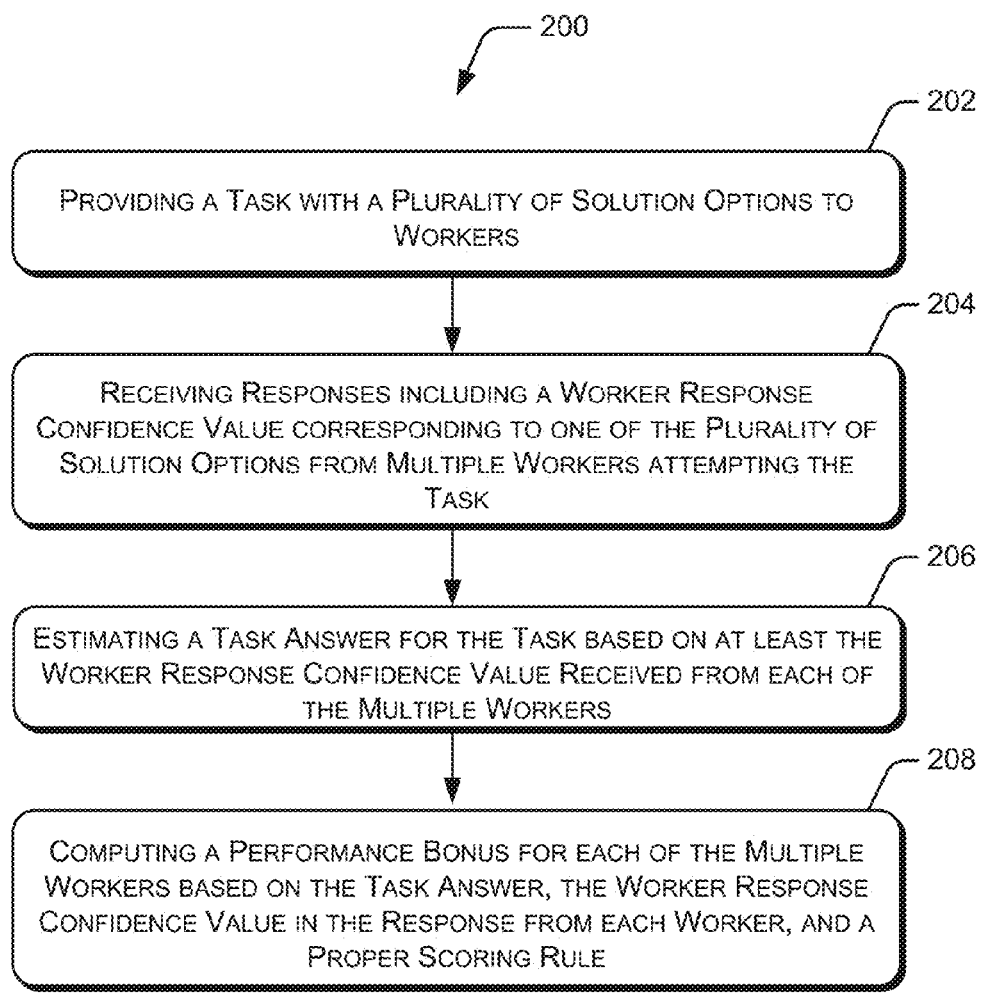
FIG. 2 illustrates a method for aggregation of results in crowdsourcing, according to an implementation of the present subject matter.

FIG. 2 illustrates a method 200 for aggregation of results in crowdsourcing, according to an implementation of the present subject matter. The method 200 is directed to describe the result aggregation in a crowdsourcing environment for one task that may be attempted by multiple workers. The method 200, in a similar manner, may be performed for result aggregation in a crowdsourcing environment for multiple tasks attempted by multiple workers.

The order in which the method 200 is described is not intended to be construed as a limitation, and any number of the described method blocks can be combined in any order to implement the method 200, or an alternative method. Furthermore, the method 200 can be implemented by processor(s) or computing device(s) through any suitable hardware, non-transitory machine readable instructions, or combination thereof.

It may be understood that steps of the method 200 can be performed by programmed computing devices. The steps of the methods 200 can be executed based on instructions stored in a non-transitory computer readable medium, as will be readily understood. The non-transitory computer readable medium may include, for example, digital memories, magnetic storage media, such as a magnetic disks and magnetic tapes, hard drives, or optically readable digital data storage media.

Further, although the method 200 for aggregation of results in crowdsourcing may be implemented in a variety of computing devices working in different communication network environments for crowdsourcing; in an embodiment described in FIG. 2, the method 200 is explained in context of the aforementioned result aggregation system 102, for ease of explanation.

Referring to FIG. 2, in an implementation, at block 202, a task is provided to workers for attempting and responding to the task. The task is provided with a plurality of solution options which are possible solutions for the task. Multiple workers may attempt the task and select one of the solution options as the correct solution. Each worker while responding is allowed to provide a worker response confidence value, corresponding to one of the solution options selected by him, in the response. As mentioned earlier, the worker response confidence value is a value indicative of confidence of the worker for the solution option selected by him as the correct solution for the task. In an implementation, the worker may provide worker response confidence values for all the solution options of the task.

At block 204, the responses including the worker response confidence value corresponding to one of the solution options, selected as the correct solution, are received from the multiple workers attempting the task. The received responses from the multiple workers are then processed, in accordance with the present subject matter, for result aggregation for the task.

After receiving the responses from the multiple workers attempting the task, a task answer is estimated for the task, at block 206, based on at least the worker response confidence value in the responses received from each of the multiple workers. As mentioned earlier, the task answer is the correct solution, one from the possible solution options, for the task estimated based on worker's responses.

For the estimation of the task answer, system response confidence values for all the solution options for the task are determined individually for each worker attempting the task. As mentioned earlier, a system response confidence value for a solution option for a task is a value indicative of confidence of the result aggregation system 102 that the solution option is the correct solution option based on response from a worker. In an implementation, the system response confidence values for all the solution options and for a worker are determined based on the worker response confidence value provided by the worker, as mentioned earlier. In an implementation, the system response confidence values for all the solution options and for a worker are determined based on the worker response confidence value provided by the worker, and based on the worker capability factor and the task difficulty factor, as mentioned earlier. In an implementation, the system response confidence values for all the solution options and for a worker are determined based on the worker response confidence value provided by the worker, and based on the worker capability factor and the task suitability factor, as mentioned earlier. The system response confidence values, for any of the implementations, are determined in a manner as described earlier in the description. The determined system response confidence values for all the solution options and for all the workers are aggregated to estimate the task answer for the task. The details of estimation of the task answer through aggregation of the system response confidence values are described earlier in the description.

Further, after estimating the task answer for the task, a performance bonus is computed, at block 208, for each of the multiple workers attempting the task. The performance bonus is understood as the monetary incentive provided to the workers for attempting the task and providing their response truthfully, The performance bonus, for each worker, is computed based on the estimated task answer, the worker response confidence value in the response from each worker, and a Proper Scoring Rule. The Proper Scoring Rule provides a measure of how correct the prediction of the worker is in respect of the estimated task answer.

For computing the performance bonus for a worker, a worker revealed confidence distribution over all the solution options for the task is determined. The worker revealed confidence distribution is determined using the worker response confidence value provided by the worker, in a manner as described earlier in the description. After determining the worker revealed confidence distribution, one of the Proper Scoring Rules is applied to the worker revealed confidence distribution in reference to the estimated task answer to determine a performance score for the worker, and subsequently, the performance bonus for the worker is computed as a linear transformation of the determined performance score. In an implementation, the Proper Scoring Rule is one of a logarithmic-based Proper Scoring Rule, a quadratic-based Proper Scoring Rule, and a power-based Proper Scoring Rule as mentioned earlier in the description. After computing the performance bonus, the monetary incentive can be paid to each worker based on the performance bonus computed for the corresponding worker.

Figure 3:
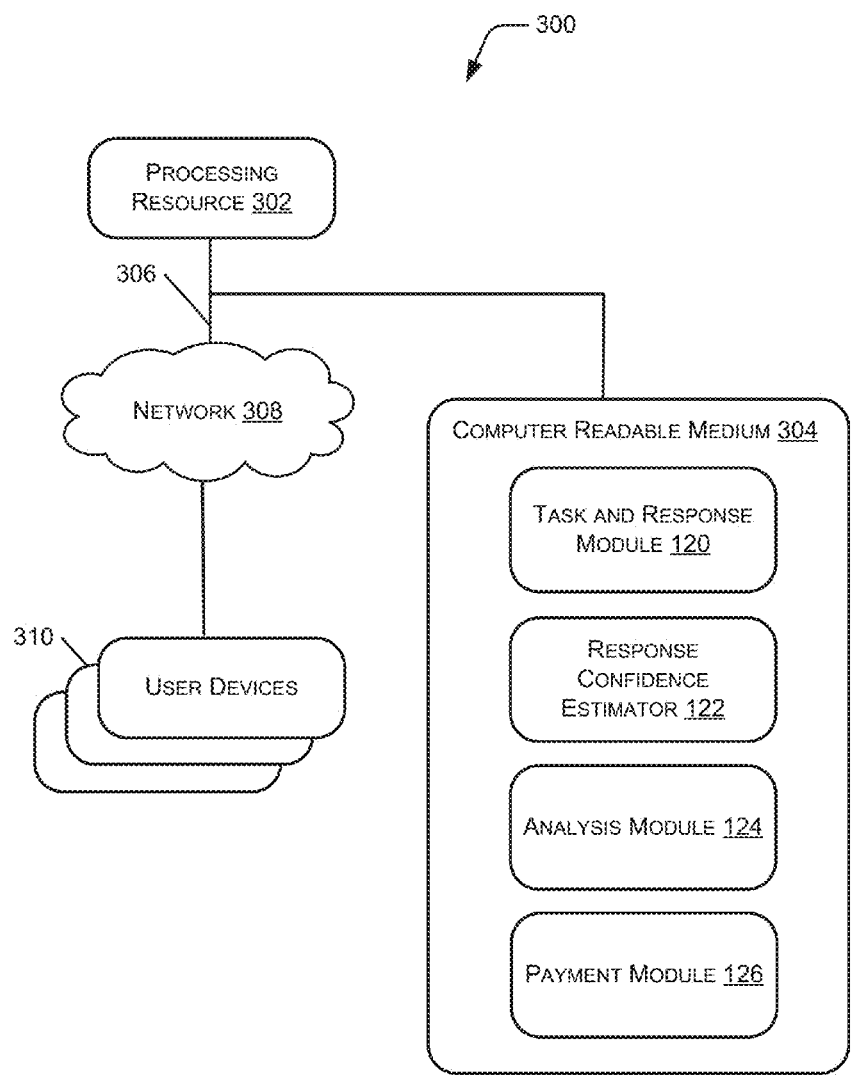
FIG. 3 illustrates a network environment for aggregation of results in crowdsourcing, according to an implementation of the present subject matter.

FIG. 3 illustrates a network environment 300 for aggregation of results in crowdsourcing, according to an implementation of the present subject matter. The network environment 300 may be a public networking environment or a private networking environment. In one implementation, the network environment 300 includes a processing resource 302 communicatively coupled to a computer readable medium 304 through a communication link 306.

For example, the processing resource 302 can be a computing device, such as a server or a computer. The computer readable medium 304 can be, for example, an internal memory device or an external memory device. In one implementation, the communication link 306 may be a direct communication link, such as any memory read/write interface. In another implementation, the communication link 306 may be an indirect communication link, such as a network interface. In such a case, the processing device 302 can access the computer readable medium 304 through a network 308. The network 308 may be a single network or a combination of multiple networks and may use a variety of different communication protocols.

The processing resource 302 and the computer readable medium 304 may also be communicatively coupled to user devices 310 over the network 308. The user devices 310 can include, for example, desktop computers, laptops, smart phones, PDAs, and tablets. The user devices 310 have applications that communicate with the processing resource 302 for user to attempt one or more tasks and provided their responses, in accordance with the present subject matter.

In one implementation, the computer readable medium 304 includes a set of computer readable instructions, such as the task and response module 120, the response confidence estimator 122, the analysis module 124, and the payment module 126. The set of computer readable instructions can be accessed by the processing resource 302 through the communication link 306 and subsequently executed to perform acts for aggregation of results in crowdsourcing.

For example, the task and response module 120 can provide a task with a plurality of solution options to workers, based on which multiple workers may attempt the task. In attempting the task, each of the multiple workers selects one of the solution options as the correct solution for the task. Also, in the response provided by each worker, the worker provides at least a worker response confidence value for the solution option selected by him as the correct solution. In an implementation, the worker may provide worker response confidence values for all the solution options of the task. The task and response module 120 can receive the responses from the multiple workers, where each of the responses include the worker response confidence value at least for the solution option selected as the correct solution.

The response confidence estimator 122 can determine system response confidence values for all the solution options for the task. The system response confidence values for all the solution options for the task are determined individually for each worker attempting the task. The system response confidence values are determined, as described earlier in the description, for the purpose of estimation of the correct answer for the task.

In an implementation, the system response confidence values for all the solution options and for a worker are determined based on the worker response confidence value provided by the worker. In an implementation, the system response confidence values for all the solution options and for a worker are determined based on the worker response confidence value provided by the worker, and based on the worker capability factor and the task difficulty factor. In an implementation, the system response confidence values for all the solution options and for a worker are determined based on the worker response confidence value provided by the worker, and based on the worker capability factor and the task suitability factor.

The analysis module 124 can estimate the task answer, i.e., the correct answer, for the task based on the system response confidence values for all the solution options and for all the workers who had attempted the task. The analysis module 124 estimates the task answer by aggregating the system response confidence values in a manner as described earlier in the description.

The payment module 126 can compute a performance bonus for each of the multiple workers attempting the task. The payment module computes the performance bonus, for each worker, based on the estimated task answer, the worker response confidence value in the response from the each worker, and a Proper Scoring Rule, as described earlier in the description.

Although implementations for result aggregation in crowdsourcing have been described in language specific to structural features and/or methods, it is to be understood that the invention is not necessarily limited to the specific features or methods described. Rather, the specific features and methods are disclosed and explained in the context of a few implementations for result aggregation in crowdsourcing.

We claim:

1. A method for result aggregation in a crowdsourcing environment, the method comprising:
   providing a task with a plurality of solution options and a range of confidence values corresponding to the plurality of solution options to multiple workers;
   receiving responses for the task from the multiple workers, wherein each of the responses comprises at least a worker's selection of one of the plurality of solution options and a worker response confidence value selected from the range of confidence values corresponding to the selected one of the plurality of solution options, and wherein the worker response confidence value is indicative of confidence of a worker for the one of the plurality of solution options to be correct;

estimating a task answer for the task based on at least the worker response confidence value received from each of the multiple workers; and computing a performance bonus for each of the multiple workers based on the task answer, the worker response confidence value in the response from each worker, and a Proper Scoring Rule.

2. The method as claimed in claim 1, wherein the estimating the task answer is based on,
   a worker capability factor for each of the multiple workers, wherein the worker capability factor is indicative of a probability of the worker to respond to a random task correctly, and
   a task difficulty factor for the task, wherein the task difficulty factor is indicative of a probability of a random worker responding to the task correctly.

3. The method as claimed in claim 2, wherein the estimating the task answer is based on boundary conditions indicative of biased nature of the multiple workers.

4. The method as claimed in claim 2, wherein the estimating the task answer is based on boundary conditions indicative of unbiased nature of the multiple workers.

5. The method as claimed in claim 1, wherein the estimating the task answer is based on,
   a worker capability factor for each of the multiple workers, wherein the worker capability factor is indicative of a probability of the worker to respond to a random task correctly, and
   a task suitability factor for the task, wherein the task suitability factor is indicative of a probability of suitability of the task for a worker.

6. The method as claimed in claim 1, wherein at least one of the responses further comprises a plurality of worker response confidence values, each of the plurality of worker response confidence values respectively corresponding to a solution option from amongst the plurality of solution options.

7. The method as claimed in claim 1, wherein the Proper Scoring Rule is one of a logarithmic-based Proper Scoring Rule, a quadratic-based Proper Scoring Rule, and a power-based Proper Scoring Rule.

8. A result aggregation system comprising:
   a processor; and
   a memory storing instructions that when executed by the processor cause the processor to:
      provide a task with a plurality of solution options to multiple workers;
      receive responses for the task from the multiple workers, wherein each of the responses comprises at least one worker response confidence value corresponding to at least one of the plurality of solution options, wherein the worker response confidence value is indicative of confidence of a worker for the at least one of the plurality of solution options to be correct and the worker response confidence value is selected from a range of confidence values;
      estimate a task answer for the task based on at least the worker response confidence value received from each of the multiple workers; and
      compute a performance bonus for each of the multiple workers based on the task answer, the worker response confidence value in the response from each worker, and a Proper Scoring Rule.

9. The result aggregation system as claimed in claim 8, wherein the processor is to estimate the task answer based on,
   a worker capability factor for each of the multiple workers, wherein the worker capability factor is indicative of a probability of the worker to respond to a random task correctly, and
   a task difficulty factor for the task, wherein the task difficulty factor is indicative of a probability of a random worker responding to the task correctly.

10. The result aggregation system as claimed in claim 8, wherein the processor is to estimate the task answer based on,
    a worker capability factor for each of the multiple workers, wherein the worker capability factor is indicative of a probability of the worker to respond to a random task correctly, and
    a task suitability factor for the task, wherein the task suitability factor is indicative of a probability of suitability of the task for a worker.

11. The result aggregation system as claimed in claim 10, wherein the task answer is estimated based on boundary conditions indicative of biased nature of the multiple workers.

12. The result aggregation system as claimed in claim 8, wherein the Proper Scoring Rule is one of a logarithmic-based Proper Scoring Rule, a quadratic-based Proper Scoring Rule, and a power-based Proper Scoring Rule.

13. A non-transitory computer-readable medium comprising instructions for result aggregation, wherein the instructions are executable by a processor to cause the processor to:
    provide a task with a plurality of solution options to multiple workers via a Graphical User Interface (GUI) that includes an input mechanism that receives worker response confidence values corresponding to the plurality of solution options;
    receive responses for the task from the multiple workers, wherein each of the responses comprises an input for the worker response confidence value corresponding to a selected one of the plurality of solution options, and wherein the worker response confidence value is indicative of confidence of a worker for the one of the plurality of solution options to be correct;
    estimate a task answer for the task based on at least the worker response confidence value received from each of the multiple workers; and
    compute a performance bonus for each of the multiple workers based on the task answer, the worker response confidence value in the response from each worker, and a Proper Scoring Rule.

14. The non-transitory computer-readable medium as claimed in claim 13, wherein the instructions are to cause the processor to estimate the task answer based on,
    a worker capability factor for each of the multiple workers, wherein the worker capability factor is indicative of a probability of the worker to respond to a random task correctly, and
    a task difficulty factor for the task, wherein the task difficulty factor is indicative of a probability of a random worker responding to the task correctly.

15. The non-transitory computer-readable medium as claimed in claim 13, wherein the instructions are to cause the processor to estimate the task answer based on,
    a worker capability factor for each of the multiple workers, wherein the worker capability factor is indicative of a probability of the worker to respond to a random task correctly, and a task suitability factor for the task, wherein the task suitability factor is indicative of a probability of suitability of the task for a worker.

16. The non-transitory computer-readable medium as claimed in claim 13, wherein the input mechanism provided on the GUI comprises slider type inputs.

17. The non-transitory computer-readable medium as claimed in claim 13, wherein the instructions are to cause the processor to:
for each of the responses:
set a system response confidence value for the selected option as equal to the worker response confidence value; and
identify left-over solution options of the plurality of solution options that are not selected in the response.

18. The non-transitory computer-readable medium as claimed in claim 17, wherein the instructions are to cause the processor to:
obtain a difference between the worker response confidence value and a maxim possible value of the worker response confidence value; and
assign system response confidence values to the left-over solution options by dividing the difference equally between each of the left-over solution options.

19. The non-transitory computer-readable medium as claimed in claim 18, wherein the instructions to compute a performance bonus for each of the multiple workers are to cause the processor to:
for each worker of the multiple workers:
obtain a worker revealed confidence distribution for the task based on the worker response confidence value and the system response confidence values;
determine a performance score based on the worker revealed confidence distribution, the estimated task answer and the Proper Scoring Rule; and
compute the performance bonus for the worker as a linear transformation of the performance score.

20. The result aggregation system of claim 8, wherein each of the responses comprises a plurality of worker response confidence values corresponding to the plurality of solution options.

* * * * *